United States Patent
Broderick et al.

(10) Patent No.: US 10,801,529 B2
(45) Date of Patent: *Oct. 13, 2020

(54) MAGNETIC FAILSAFE PISTON RETENTION ASSEMBLY, AND RELATED COMPONENTS, SYSTEMS, AND METHODS

(71) Applicant: Lockheed Martin Corporation, Bethesda, MD (US)

(72) Inventors: Daniel Andrew Broderick, Philadelphia, PA (US); Stephen Firkser, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/152,858

(22) Filed: Oct. 5, 2018

(65) Prior Publication Data
US 2019/0040881 A1 Feb. 7, 2019

Related U.S. Application Data

(63) Continuation of application No. 14/806,004, filed on Jul. 22, 2015, now Pat. No. 10,100,853.

(51) Int. Cl.
*F15B 15/26* (2006.01)
*E05B 47/00* (2006.01)
(Continued)

(52) U.S. Cl.
CPC ........ *F15B 15/261* (2013.01); *E05B 47/0038* (2013.01); *E05B 51/02* (2013.01);
(Continued)

(58) Field of Classification Search
CPC .... F15B 15/1466; F15B 15/261; F15B 15/26; F03B 13/26; F03B 13/262; E05B 47/0038; E05B 51/025; Y02E 10/28; Y02E 10/226
(Continued)

(56) References Cited

U.S. PATENT DOCUMENTS

| 4,275,759 A | * | 6/1981 | Huang | F16K 15/021 |
| | | | | 137/528 |
| 4,637,427 A | * | 1/1987 | Nolan | F16K 31/082 |
| | | | | 137/460 |

(Continued)

FOREIGN PATENT DOCUMENTS

| KR | 10-2011-0038786 A | | 4/2011 |
| KR | 101158761 | * | 6/2012 |
| WO | 2004099724 A2 | | 11/2004 |

OTHER PUBLICATIONS

Author Unknown, "Heavy Duty Hydraulic Cylinders: Series 2H / 2HD & 3H / 3HD," Catalog HY08-1114-6/NA, www.parker.com/cylinder, Dec. 2014, Parker Hannifin Corporation, 132 pages.
(Continued)

*Primary Examiner* — Dustin T Nguyen
(74) *Attorney, Agent, or Firm* — Withrow & Terranova, PLLC

(57) ABSTRACT

A failsafe piston retention assembly, and related components, systems, and methods are disclosed. A failsafe piston retention assembly comprises a head comprising a head body having a first surface. The assembly also includes a piston having second surface, the piston slidably coupled with respect to the head. The piston has a retracted configuration and an unretracted configuration. In the retracted configuration, the second surface is fixed with respect to the first surface by a magnetic force. One advantage of this arrangement is that the piston is retained in its retracted configuration in the event of an operational failure of the piston mechanism. For example, for a hydraulically controlled piston, the magnetic force retains the piston in a retracted configuration even in the event of a loss of hydraulic pressure.

16 Claims, 5 Drawing Sheets

(51) Int. Cl.
  *E05B 51/02* (2006.01)
  *F03B 11/00* (2006.01)
  *F03B 13/26* (2006.01)

(52) U.S. Cl.
  CPC .............. *F03B 11/00* (2013.01); *F03B 13/26* (2013.01); *F03B 13/264* (2013.01); *Y02E 10/226* (2013.01); *Y02E 10/28* (2013.01)

(58) Field of Classification Search
  USPC .............................. 91/43, 51; 60/398; 290/53
  See application file for complete search history.

(56) References Cited

U.S. PATENT DOCUMENTS

| | | | | |
|---|---|---|---|---|
| 4,878,464 | A | * | 11/1989 | Richeson, Jr. .......... F01L 9/026 123/90.11 |
| 5,406,879 | A | | 4/1995 | Willacy |
| 6,038,959 | A | | 3/2000 | Sawada |
| 7,448,310 | B2 | | 11/2008 | Atkinson |
| 7,971,883 | B2 | | 7/2011 | Soroka et al. |
| 8,438,967 | B2 | | 5/2013 | Andersen et al. |
| 10,100,853 | B2 | | 10/2018 | Broderick et al. |
| 2004/0258469 | A1 | * | 12/2004 | Hofmann ............ E05B 47/0038 403/327 |
| 2013/0067819 | A1 | | 3/2013 | McLain |
| 2014/0197345 | A1 | | 7/2014 | Graichen et al. |
| 2014/0374974 | A1 | | 12/2014 | Goold et al. |
| 2015/0091395 | A1 | | 4/2015 | Spivak |
| 2017/0023030 | A1 | | 1/2017 | Broderick et al. |

OTHER PUBLICATIONS

Author Unknown, "KTR-STOP® Brake Systems: The efficient high-power brake," KTR Kupplungstechnik GmbH, Apr. 2012, www.ktr.com, 32 pages.
Author Unknown, "Rotor Locking Device HRV," Pintsch Bubenzer, Date Unknown, HRV Catalog, pp. B43-B44.
Vokoun, et al., "Magnetic Forces Between Arrays of Cylindrical Permanent Magnets," Journal of Magnetism and Magnetic Materials, vol. 323, Aug. 20, 2010, pp. 55-60.
International Search Report and Written Opinion for International Patent Application No. PCT/US2016/043161, dated Oct. 20, 2016, 10 pages.
International Preliminary Report on Patentability for International Patent Application No. PCT/US2016/043161, dated Feb. 1, 2018, 7 pages.
Non-Final Office Action for U.S. Appl. No. 14/806,004, dated Oct. 13, 2017, 15 pages.
Final Office Action for U.S. Appl. No. 14/806,004, dated Mar. 15, 2018, 12 pages.
Notice of Allowance for U.S. Appl. No. 14/806,004, dated Jun. 11, 2018, 8 pages.

* cited by examiner

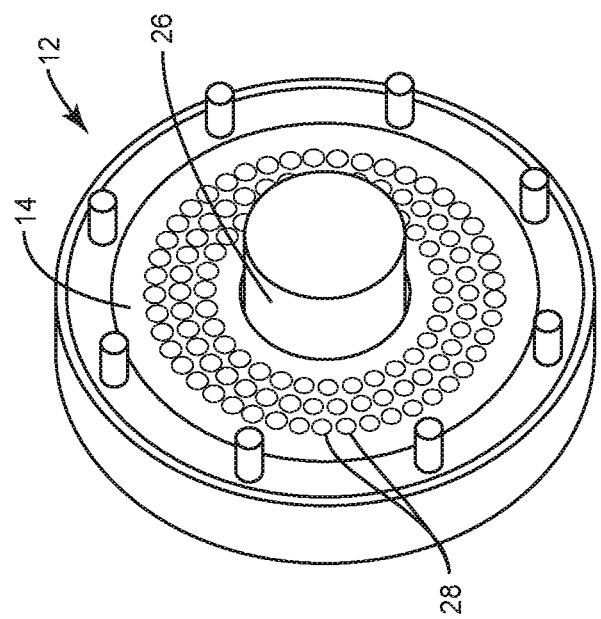
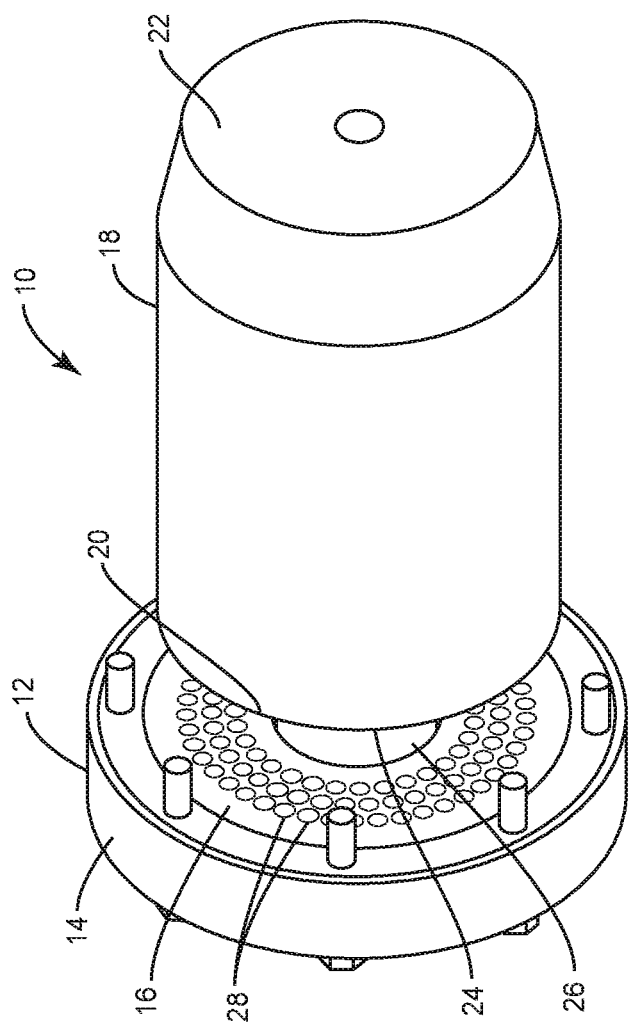
FIG. 1B
FIG. 1A

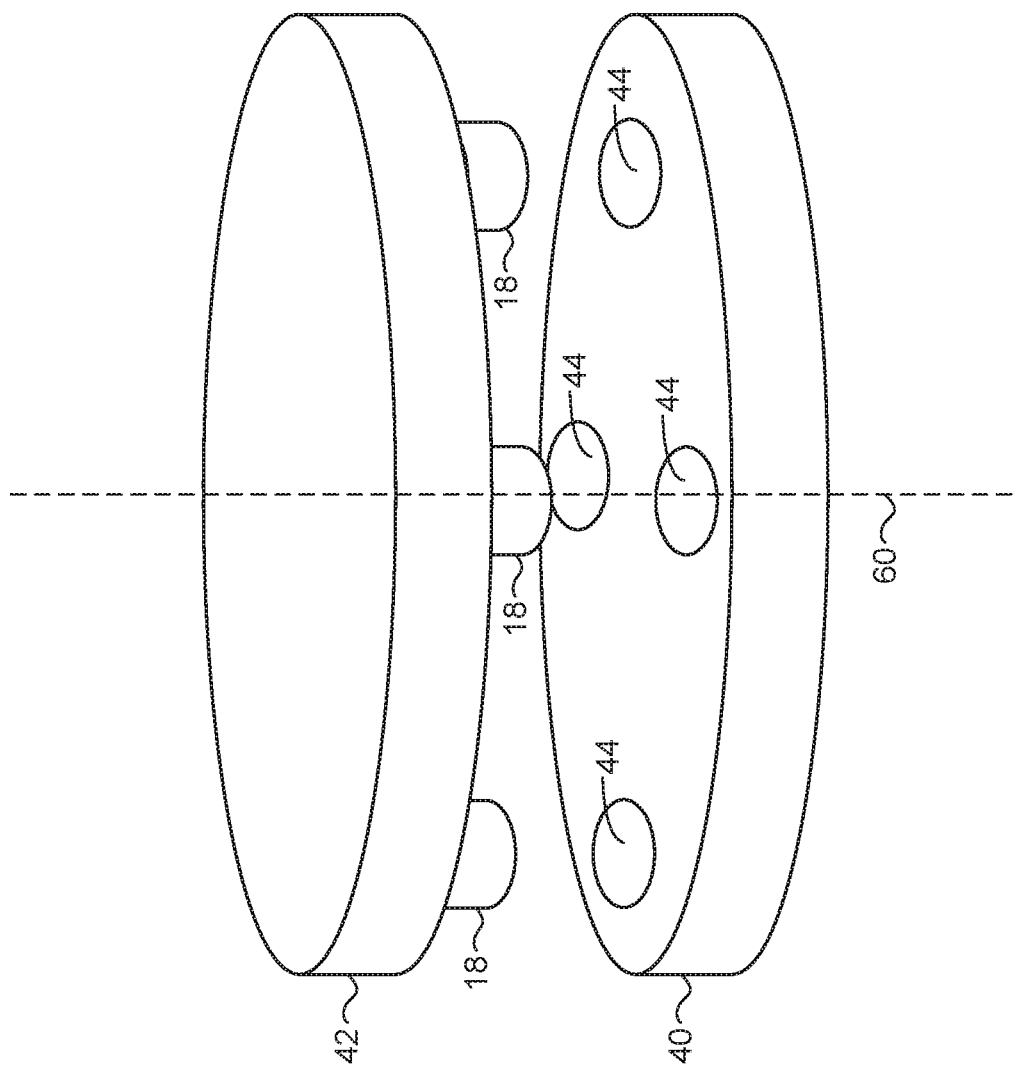

MAGNETIC FAILSAFE PISTON RETENTION ASSEMBLY, AND RELATED COMPONENTS, SYSTEMS, AND METHODS

RELATED APPLICATIONS

This application is a continuation of co-pending U.S. patent application Ser. No. 14/806,004, filed on Jul. 22, 2015, entitled "MAGNETIC FAILSAFE PISTON RETENTION ASSEMBLY, AND RELATED COMPONENTS, SYSTEMS, AND METHODS," which is hereby incorporated herein by reference in its entirety.

TECHNICAL FIELD

Embodiments disclosed herein relate to piston retention assemblies, and more specifically to magnetic failsafe piston retention assemblies, and related components, systems, and methods.

BACKGROUND

Mechanical piston assemblies have a number of applications. In some applications, one or more piston assemblies may be used as a locking mechanism, such as a rotor lock in which the piston serves as an actuated locking pin in an unretracted configuration to lock a rotor in a predetermined orientation. When not in use to lock the system, the piston is in a retracted configuration so that the rotor can be rotated. In some applications, the piston may be vertically oriented, such that gravitational force urges the piston into the unretracted configuration in the absence of a sufficient retaining force.

In one example, a tidal turbine yaw drive system (YDS) may employ a vertically oriented rotor lock having a mechanical piston assembly as described above. For these systems, a typical piston may weigh hundreds of pounds, thereby necessitating a large retention force, such as by an internal hydraulic pressure, to maintain the piston in a retracted configuration. However, in the event of loss of the hydraulic pressure due to failure, the piston is in danger of being urged into the unretracted configuration by gravity, thereby preventing the YDS from being unlocked and allowed to rotate.

SUMMARY

Embodiments include a failsafe piston retention assembly, and related components, systems, and methods. In one embodiment, a failsafe piston retention assembly comprises a head comprising a head body having a first surface. The assembly also includes a piston having second surface, the piston slidably coupled with respect to the head. The piston has a retracted configuration and an unretracted configuration. In the retracted configuration, the second surface is fixed with respect to the first surface by a magnetic force. One advantage of this arrangement is that the piston is retained in its retracted configuration in the event of an operational failure of the piston mechanism. For example, for a hydraulically controlled piston, the magnetic force retains the piston in a retracted configuration even in the event of a loss of the hydraulic pressure.

In one exemplary embodiment, a failsafe piston retention assembly is disclosed. The assembly comprises a head comprising a head body having a first surface. The assembly further comprises a piston having second surface. The piston is slidably coupled with respect to the head and has a retracted configuration and an unretracted configuration. In the retracted configuration, the second surface is fixed with respect to the first surface by a magnetic force.

In another exemplary embodiment, a system for retaining a piston in a retracted configuration is disclosed. The system comprises a movable body comprising at least one head comprising a head body having a first surface. The movable body further comprises at least one piston each having second surface. Each piston is slidably coupled with respect to the head and has a retracted configuration and an unretracted configuration. In the retracted configuration, the second surface is fixed with respect to the first surface by a magnetic force. The system further comprises a base comprising at least one recess configured to receive one of the at least one pistons therein when the piston is in the unretracted configuration such that the movable body is fixed with respect to the base. The system has a locked configuration and an unlocked configuration. In the locked configuration, at least one of the at least one piston is received in one of the at least one recess in the unretracted configuration such that the movable body is fixed with respect to the base. In the unlocked configuration, each of the at least one piston is in the retracted configuration such that the movable body is movable with respect to the base.

In another exemplary embodiment, a method of retaining a piston in a retracted configuration is disclosed. The method comprises moving a piston from an unretracted configuration to a retracted configuration. The method further comprises providing a magnetic force to fix the piston in the retracted configuration.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 1A and 1B illustrate perspective views of portions of an exemplary failsafe piston retention assembly according to an embodiment;

FIG. 4 is a schematic diagram of a pedestal and base according to one embodiment.

DETAILED DESCRIPTION

Figure 2A:
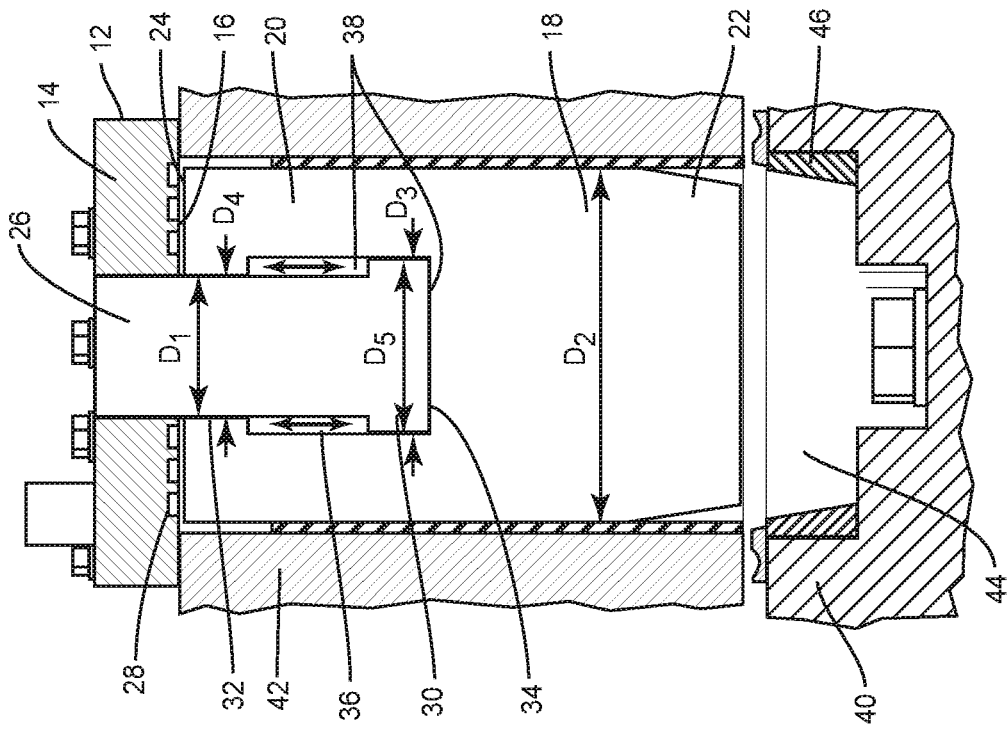
FIGS. 2A and 2B illustrate cross-sectional views of the failsafe piston retention assembly of FIGS. 1A and 1B in an unretracted configuration and a retracted configuration.

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first surface" and "second surfaces," and does not imply a priority, a type, an importance, or other attribute, unless otherwise stated herein. The term "substantially" used herein in conjunction with a numeric value means any value that is within a range of five percent greater than or ten percent less than the numeric value.

Embodiments include a failsafe piston retention assembly, and related components, systems, and methods. In one embodiment, a failsafe piston retention assembly comprises a head comprising a head body having a first surface. The assembly also includes a piston having second surface, the piston slidably coupled with respect to the head. The piston has a retracted configuration and an unretracted configuration. In the retracted configuration, the second surface is fixed with respect to the first surface by a magnetic force. One advantage of this arrangement is that the piston is retained in its retracted configuration in the event of an operational failure of the piston mechanism. For example, for a hydraulically controlled piston, the magnetic force retains the piston in a retracted configuration even in the event of a loss of the hydraulic pressure.

In this regard, FIGS. 1A and 1B illustrate a failsafe piston retention assembly 10 according to an embodiment. The assembly 10 includes a head 12 comprising a head body 14, which includes an engagement surface 16. The assembly 10 also includes a piston 18 extending between a first end 20 and a second end 22, with a complementary engagement surface 24. The piston 18 is also slidably coupled with respect to the head 12. In this embodiment, the head 12 includes a head extension member 26 fixed with respect to the head body 14 and extending in an axial direction and perpendicularly with respect to the engagement surface 16 of the head body 14, such that the piston 18 is slidably coupled to the head extension member 26 and is configured to slidably move in an axial direction with respect to the head extension member 26.

The piston 18 has a retracted configuration and an unretracted configuration. In the retracted configuration, the engagement surface 24 of the piston 18 is fixed with respect to the engagement surface 16 of the head body 14 by a magnetic force. In this embodiment, the magnetic force is provided by a plurality of magnets 28 arranged in an array in the head body 14.

Referring now to FIG. 1B, a view of the head 12 with a portion of the head extension member 26 is illustrated. In this figure, a portion of the head extension member 26 has been omitted to better illustrate an arrangement of the magnets 28 disposed in the engagement surface 16 of the head body 14. In this embodiment, for example, it can be seen that a plurality of the magnets 28 may be arranged in concentric rings around the head extension member 26, so as to maximize a surface area of the magnets 28 configured to contact and magnetically restrain the first end 20 of the piston 18. One advantage of this arrangement is that the magnets 28 may be permanent magnets that form a passive failsafe against the piston 18 moving into an unretracted configuration, for example, if the assembly 10 includes a hydraulically controlled piston 18 and experiences a loss of hydraulic pressure.

Figure 2B:
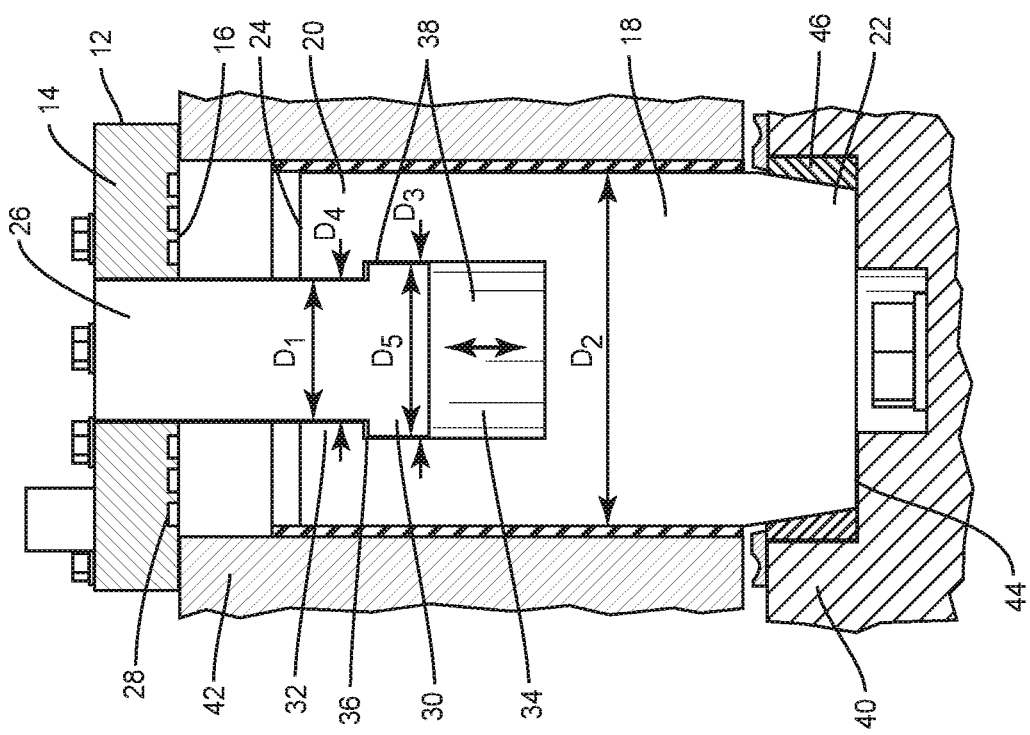

Referring now to FIG. 2A, it can be seen that the head extension member 26 includes a head flange 30 disposed at a distal end of the head extension member 26. In this embodiment, the head flange 30 extends radially out from the distal end of the head extension member 26. The head extension member 26 and head flange 30 are configured to be received by an interior of the piston 18. The head flange 30 is also retained within an interior of the piston 18 by an inwardly facing piston flange 32. This arrangement permits the piston 18 to move in a linear direction along a common axis of the head 12 and the piston 18, such that the linear movement is restrained by the head flange 30 of the head 12 at one end, and the engagement surface 16 of the head body 14 of the head 12 at the other end. In this regard, FIG. 2A illustrates the piston 18 in an unretracted configuration, in which the piston flange 32 is restrained from the linear movement by the head flange 30, and FIG. 2B illustrates the piston 18 in a retracted configuration, in which the first end 20 of the piston 18 is restrained by the engagement surface 16 of the head 12. In this embodiment, the piston 18 is moved between the unretracted and retracted configurations by a hydraulic mechanism. In this regard, the head flange 30 and the piston flange 32 define a first space 34 on one side of the head flange 30 and an interior of the piston 18, and a second space 36 on the opposite side of the head flange 30 and extending between the head flange 30 and the piston flange 32. In this embodiment, the first end 20 of the piston 18 contacts and is restrained by the head flange 30 when the piston 18 is in the retracted configuration, and the piston flange 32 contacts and is restrained by the head flange 30 when the piston 18 is in the unretracted configuration In this embodiment, the head extension member 26 is substantially cylindrical and has an external diameter $D_1$, and a portion of the piston 18 at the first end 20 of the piston 18 is substantially annular and has an external diameter $D_2$ larger than the first diameter $D_1$, and an internal diameter $D_3$ larger than the external diameter $D_1$ of the head extension member 26, such that the head extension member 26 can be received therein. In this embodiment, the piston flange 32 extends radially inwardly and has an internal diameter $D_4$ substantially equal to the external diameter $D_1$ of the head extension member 26, such that the first space 34 in the piston 18 is hydraulically isolated from an exterior of the piston 18. Likewise, the head flange 30 extends radially outwardly from the head extension member 26 and has an external diameter $D_5$ substantially equal to the internal diameter $D_4$ of the piston 18, such that the second space 36 in the piston 18 is hydraulically isolated from the first space 34 of the piston 18, as well as from the exterior of the piston 18. In this manner, by applying the hydraulic pressure to one of the first and second spaces 34, 36, the piston 18 can be hydraulically moved between the respective unretracted and retracted configurations. In this embodiment, the hydraulic force applied to move the piston 18 into an unretracted configuration may be significantly larger than the passive magnetic force exerted by the magnets 28 on the piston 18. In this manner, the magnetic force of the magnets 28 is greater than a gravitational force exerted on the piston 18 when the head 12 is oriented above the piston 18, such that the magnetic force is greater than the gravitational force, thereby inhibiting the piston 18 from moving into the unretracted configuration when the piston 18 is in the retracted configuration in the event of a hydraulic failure. However, the magnets 28 in this embodiment are not so powerful that they would otherwise interfere with the operation of the hydraulic functions of the piston 18 and the head 12.

As shown by FIG. 2A, when the piston 18 is in the unretracted configuration, the second end 22 of the piston 18 is received within a recess 44 of a base 40. In this embodiment, the recess 44 includes a recessed skirt 46, which is configured to securely abut and restrain the second end 22 of piston 18 against a side-to-side movement. When the assembly 10 provides the hydraulic pressure into the first space 34, the piston 18 extends and is held in place in the recessed skirt 46 by the hydraulic pressure in the first space 34. Similarly, to move the piston 18 into a retracted configuration, the hydraulic pressure within the second space 36 is increased and the hydraulic pressure in the first space is reduced, thereby moving the piston 18 vertically out of the recess 44 of the base 40, thereby permitting a pedestal 42 to freely rotate with respect to the base 40. However, if the hydraulic pressure is lost in the second space 36, for example by a mechanical or hydraulic failure, there is a risk of the piston 18 falling into the recess 44 by a force of gravity. Here, however, because the first end 20 of the piston 18 abuts the plurality of the magnets 28 disposed in the engagement surface 16 of the head 12, a magnetic attraction of magnets 28 to a ferrous material of the piston 18 retains the piston 18 in the retracted configuration against the force of gravity. However, when the hydraulic pressure is increased again in the first space 34, the hydraulic pressure is sufficient to overcome the magnetic attraction between the magnets 28 and the first end 20 of the piston 18. In some embodiments, the hydraulic pressure for moving and retaining the piston 18 between the unretracted and retracted configurations may be orders of magnitude or greater than the magnetic attraction of the magnets 28 with respect to the first end 20 of the piston 18.

Figure 3A:
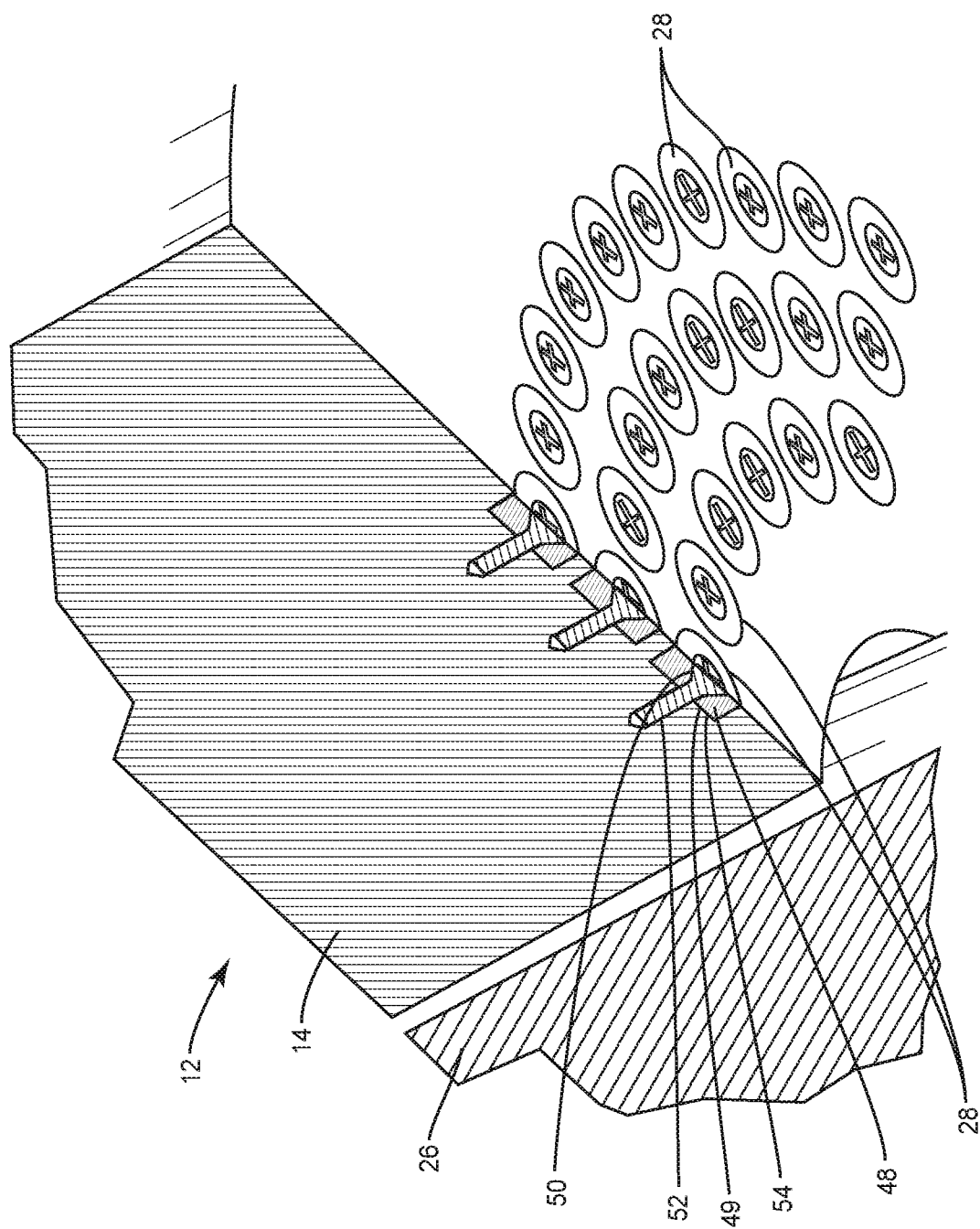
FIGS. 3A and 3B illustrate detailed perspective cross-sectional views of magnetic elements suitable for use with the embodiment of FIGS. 1A-2B, according to different exemplary embodiments.
Figure 3B:
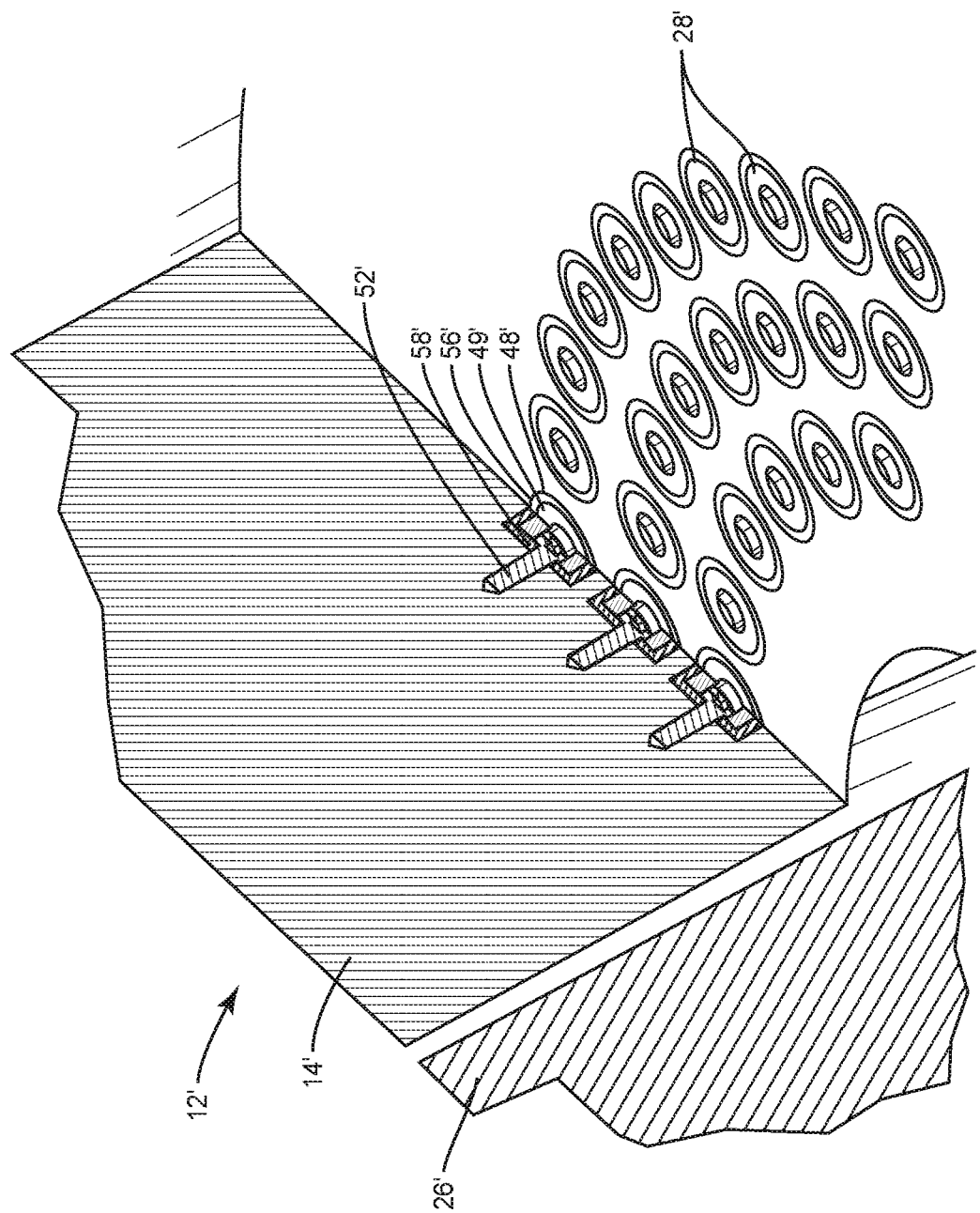

Referring now to FIGS. 3A and 3B, alternative configurations for securing the magnets 28 flush or substantially flush with the engagement surface 16 of the head body 14 are illustrated. Referring now to FIG. 3A, in one embodiment, each magnet 28 includes a magnetic element 48 formed as a substantially annular disk of a neodymium alloy or other rare earth magnetic material. In this embodiment, each magnetic element 48 has a countersunk hole 50 therethrough for accommodating a conventional screw 52 or other threaded fastener. It should be understood that other types of fastening methods may be employed instead of or in addition to the screw 52. In this embodiment, each magnetic element 48 comprises a disc of neodymium magnetic material 49 fitted into a complimentary counterbore 54 substantially flush with the engagement surface 16 of the head body 14. However, it may also be desirable to form each counterbore 54 such that each magnetic element 48 is recessed in the head body 14, so that the magnetic elements 48 do not make contact with the engagement surface 24 of the piston 18 when the piston 18 is in the retracted configuration, thereby reducing the possibility of the piston 18 tearing out the magnetic element 48 when the piston 18 is next moved into the unretracted configuration, and also reducing the possibility of damage to the magnetic element 48 when the piston 18 is moved into the retracted configuration. In this embodiment, the piston 18 comprises a ferrous portion proximate to the engagement surface 24 of the piston 18, such that the ferrous portion is configured to be attracted to the magnetic force of the magnetic elements 48 to fix the engagement surface 24 of the piston 18 with respect to the engagement surface 16 of the head body 14 when the piston 18 is in the retracted configuration.

In this embodiment, the magnetic material 49 is formed from a nickel-plated neodymium alloy, but it should be understood that other types of magnetic material may be used. In this embodiment, the head body 14 comprises a rotor lock plate in which the counterbore 54 is formed. Each screw 52 is secured through the magnetic element 48 into the head body 14, thereby securing the magnet 28 within the head body 14 such that a magnetic field exists at the engagement surface 16 of the head body 14. In some embodiments, it may also be desirable to include additional components to prevent damage to the magnetic elements 48 during assembly. For example, neodymium is a relatively brittle material that may be damaged by overtorquing of a screw or other threaded fastener. In this regard, FIG. 3B illustrates an alternative embodiment, in which each magnet 28' includes a magnetic element 48' comprising a disk of neodymium magnetic material 49' fitted into a metallic cup 56' having a hole 58' for accommodating a screw 52'. The magnetic material 49' may be fit into and retained by the metallic cup 56' via a friction fit, adhesive, or other means. In this manner, the magnetic material 49' may be protected from cracking or other damage, because the head of the screw 52' does not exert force against the magnetic material 49'.

The failsafe piston retention assembly 10 of FIGS. 1A-1B may be used in a number of different applications. For example, in one embodiment, the failsafe piston retention assembly 10 may be used as part of a rotatable tidal turbine platform. Referring back to FIGS. 2A-2B, a tidal turbine platform may include a base 40 with a pedestal 42 rotatably mounted thereon about a shaft or other rotation mechanism. The pedestal 42 may include a plurality of pistons 18, each being part of a failsafe piston retention assembly 10 according to FIGS. 1A-2B. Likewise, the base 40 includes a plurality of recesses 44, for accommodating one of the pistons 18. In this embodiment, to lock the tidal turbine platform at a desired rotational angle, one or more pistons 18 are activated into the unretracted configuration, with each unretracted piston 18 extending into a respective recess 44 of the base 40. As discussed above, if a single piston 18 fails, there is a danger of a piston 18 remaining in one of the recesses 44 by the force of gravity. This is particularly problematic in tidal turbines, because it is very difficult and expensive to service and repair these turbines once they have been installed under water in areas with strong tidal activity. In this embodiment, however, in the event of a hydraulic failure of the piston 18, the respective piston 18 would be retained in the retracted configuration by the plurality of magnets 28 (See FIGS. 2A-2B), thereby avoiding the need for servicing the piston 18 in the event of the failure of one or more pistons 18.

FIG. 4 is a schematic diagram of the pedestal 42 and the base 40 according to one embodiment. The pedestal 42 may include the plurality of pistons 18, each being part of the failsafe piston retention assembly 10 according to FIGS. 1A-2B. Likewise, the base 40 includes the plurality of recesses 44, for accommodating one of the pistons 18. The pedestal 42 may rotate about an axis of rotation 60.

Those skilled in the art will recognize improvements and modifications to the preferred embodiments of the disclosure. All such improvements and modifications are considered within the scope of the concepts disclosed herein and the claims that follow.

The invention claimed is:
1. A failsafe piston retention assembly comprising:
a head comprising a head body having a first surface; and
a hydraulically controlled piston having a second surface,
  the hydraulically controlled piston being slidably coupled with respect to the head and having a retracted configuration and an unretracted configuration, wherein in the retracted configuration, the second surface being fixed with respect to the first surface by a magnetic force;

wherein the head is configured to be fixed to a pedestal, and wherein the piston is configured to engage a base that forms a plurality of recesses, the base and the pedestal being rotatable with respect to one another when the piston is in the retracted configuration, wherein each recess of the plurality of recesses corresponds to a different rotational position of the pedestal with respect to the base, the piston being moveable from the retracted configuration to the unretracted configuration to engage a corresponding one of the plurality of recesses and thereby prevent the base and the pedestal from being rotatable with respect to one another.

2. The failsafe piston retention assembly of claim 1, further comprising a head extension member fixed with respect to the head body and extending substantially perpendicularly with respect to the first surface, wherein the piston is slidably coupled with respect to the head extension member.

3. The failsafe piston retention assembly of claim 2, further comprising a head flange connected to the head extension member at a distal end of the head, wherein a first end of the piston contacts and is restrained by the head flange when the piston is in the retracted configuration.

4. The failsafe piston retention assembly of claim 3, further comprising a piston flange at the first end of the piston, wherein the piston flange contacts and is restrained by the head flange when the piston is in the unretracted configuration.

5. The failsafe piston retention assembly of claim 4, wherein:

the head extension member is substantially cylindrical and has a first diameter; and a portion of the piston is substantially annular and has a second external diameter larger than the first diameter, and a third internal diameter larger than the first diameter.

6. The failsafe piston retention assembly of claim 5, wherein:

the piston flange extends radially inwardly from the piston and has a fourth internal diameter substantially equal to the first diameter of the head extension member.

7. The failsafe piston retention assembly of claim 6, wherein:

the head flange extends radially outwardly from the head extension member and has a fifth diameter substantially equal to the third internal diameter of the piston.

8. The failsafe piston retention assembly of claim 1, wherein the piston is movable from the retracted configuration to the unretracted configuration by a first hydraulic force greater than the magnetic force.

9. The failsafe piston retention assembly of claim 8, wherein the piston is movable from the unretracted configuration to the retracted configuration by a second hydraulic force.

10. The failsafe piston retention assembly of claim 1, wherein the magnetic force is greater than a gravitational force exerted on the piston when the head is oriented above the piston, such that the magnetic force inhibits the piston from moving into the unretracted configuration when the piston is in the retracted configuration.

11. The failsafe piston retention assembly of claim 1, wherein the head body comprises at least one magnetic element configured to provide the magnetic force to fix the second surface of the piston with respect to the first surface of the head body when the piston is in the retracted configuration.

12. The failsafe piston retention assembly of claim 11, wherein the at least one magnetic element comprises an array of a plurality of magnetic elements.

13. The failsafe piston retention assembly of claim 11, wherein the head body forms at least one counterbore configured to receive the at least one magnetic element such that each magnetic element is substantially flush with the first surface of the head body.

14. The failsafe piston retention assembly of claim 13, wherein each magnetic element has at least one threaded fastener extending therethrough to secure each magnetic element to the head body.

15. The failsafe piston retention assembly of claim 14, wherein the magnetic element is a neodymium alloy.

16. The failsafe piston retention assembly of claim 11, wherein the piston comprises a ferrous material proximate to the second surface of the piston, such that the ferrous material is configured to be attracted to the magnetic force provided by the at least one magnetic element to fix the second surface of the piston to the first surface of the head body when the piston is in the retracted configuration.

* * * * *